United States Patent
Dangy-Caye (10) Patent No.: US 9,184,793 B2
(45) Date of Patent: Nov. 10, 2015

(54) POWER LINE-COMMUNICATION ADAPTER

(75) Inventor: Nicolas Dangy-Caye, Rueil-Malmaison (FR)

(73) Assignee: SAGEMCOM BROADBAND SAS, Rueil-Malmaison (FR)

(*) Notice: Subject to any disclaimer, the term of this patent is extended or adjusted under 35 U.S.C. 154(b) by 758 days.

(21) Appl. No.: 13/375,014

(22) PCT Filed: Jun. 1, 2010

(86) PCT No.: PCT/EP2010/057665
§ 371 (c)(1),
(2), (4) Date: Nov. 29, 2011

(87) PCT Pub. No.: WO2010/139705
PCT Pub. Date: Dec. 9, 2010

(65) Prior Publication Data
US 2012/0068554 A1     Mar. 22, 2012

(30) Foreign Application Priority Data
Jun. 5, 2009  (FR) .................................... 09 053727

(51) Int. Cl.
*H04B 3/54* (2006.01)

(52) U.S. Cl.
CPC ........ *H04B 3/542* (2013.01); *H04B 2203/5445* (2013.01); *H04B 2203/5462* (2013.01); *Y10T 307/74* (2015.04)

(58) Field of Classification Search
CPC .. H04B 2203/5462; H04B 3/54; H04B 3/542; H04B 2203/5429
USPC .................................................. 307/1, 38, 39
See application file for complete search history.

(56) References Cited

U.S. PATENT DOCUMENTS 8,243,918 B2 * 8/2012 Hazani et al. ............ 379/413.02
2009/0295327 A1 * 12/2009 McGinley et al. ............ 320/111

FOREIGN PATENT DOCUMENTS

| EP | 1767913 | | 3/2007 |
| EP | 2051437 | | 4/2009 |
| JP | 61161832 A | * | 7/1986 |
| JP | 9-056060 | | 2/1997 |
| JP | 2001-136668 | | 5/2001 |
| JP | 2008187636 A | * | 8/2008 |
| KR | 20040050716 A | * | 6/2004 |

OTHER PUBLICATIONS

International Search Report for PCT/EP2010/057665 mailed Jul. 28, 2010.
Written Opinion of the International Searching Authority mailed Jul. 28, 2010.
International Search Report in English for PCT/EP2011/061371 dated Jan. 17, 2013.

* cited by examiner

*Primary Examiner* — Jared Fureman
*Assistant Examiner* — Brett Squires
(74) *Attorney, Agent, or Firm* — Nixon & Vanderhye, PC (57) ABSTRACT

The present invention relates to a power-line-communication adapter including a main functional unit (PLTC) supplied with direct voltage by an internal voltage converter (AC/DC), characterized in that said adapter includes at least one switch (I1, I2) for interrupting the direct current supply to the main unit (PLTC) while the adapter is operating in standby mode.

7 Claims, 6 Drawing Sheets

POWER LINE-COMMUNICATION ADAPTER

This application is the U.S. national phase of International Application No. PCT/EP2010/057665 filed 1 Jun. 2010 which designated the U.S. and claims priority to FR 09/53727 filed 5 Jun. 2009, the entire contents of each of which are hereby incorporated by reference.

The present invention concerns a power-line-communication adapter.

The use of carrier current technology for distributing high-rate stream on a domestic electrical network is widely recognised today as being an advantageous technology and because, among other things, it uses an existing distribution network at the subscriber and the transmission capacity on this type of transmission channel is high.

To designate this type of technology, carrier current line (CCL) or PLC (Power Line Communication) or BPL (Broadband for Power Line) are also spoken of. A carrier current line may for example be in accordance with the HomeplugAV standard, or ITU G.hn, or based on the technology developed by the companies UPA/OPERA or Panasonic.

The principle of carrier current technology consists of superimposing, on the 50 or 60 Hz electrical current, a signal at a higher frequency and of low energy. This second signal is propagated on the electrical network and can be received and decoded remotely by each carrier current adapter connected to a socket of the electrical network.

A carrier current adapter is in the form of a box provided with electronic components that, in functional terms, can be grouped together in a main unit that fulfils the function of a carrier current modem. For this purpose, it also comprises a coupler that eliminates the low-frequency components of a signal carried by the electrical network, and means for using error correcting codes in order to counteract the harmful effects of noise and attenuations. It also comprises means for transforming a stream of bits into an analogue signal for transmission and conversely for reception.

A carrier current adapter must be supplied by the voltage of the electrical network, typically 230 V in Europe. This mains voltage is required for supplying the main unit but is also converted into several DC voltages that are required by the main unit. A voltage converter is then used for this purpose followed by one or even several DC voltage adapters. Moreover, an apparatus is generally connected to the adapter in order to receive and transmit digital streams on the electrical network via this adapter. This type of apparatus requires to be supplied by a DC electrical voltage in order to function and is generally associated, for this purpose, with an external voltage converter that is connected to the electrical network.

There exist so-called power-line-communication adapters that comprise internally a voltage converter that delivers both a DC voltage from which the DC voltages required by the main unit are derived, and also the DC voltage that is required for supplying the apparatus that is connected to this adapter. Thus a single voltage converter is used, making the use of these adapters advantageous from an energy and logistic point of view.

Present power-line-communication adapters are however confronted with the problem of heterogeneity of the range of appliances with which they are liable to be used. This is because appliances such as a domestic gateway, a set top box or a network storage device (NAS), to cite only a few of them, accept DC supply voltages and powers that may be different. Thus a power-line-communication adapter provided for a specific apparatus may not be suitable in terms of power and/or voltage for being used with another apparatus.

The solution currently adopted is firstly to restrict the use of carrier current adapters to a range of appliances compatible in terms of voltage and, secondly, to align the power supplied by the built-in adapter with the highest power necessary for this range. In other words, the present solutions address a restricted range with oversizing of the power supplied.

The problem solved by the present invention is to optimise the consumption of a power-line-communication adapter and to address a range of appliances that are heterogeneous in terms of power and voltage.

To this end, the present invention concerns a power-line-communication adapter that is characterised in that it comprises at least one means for interrupting the DC voltage supply of the main unit when the adapter is functioning in standby mode.

This is because, in the present power-line-communication adapters, the connections between the output of the internal voltage converter and the main unit remain supplied with DC voltage when the carrier current adapter is functioning in standby mode, which causes unnecessary consumption, in particular with the voltage adapters used for obtaining the various derived DC voltages that supply the main unit.

According to one embodiment, the means for interrupting the DC voltage supply of the main unit is situated downstream of the voltage converter.

According to another embodiment, the means for interrupting the DC voltage supply to the main unit is situated upstream of the voltage converter.

This embodiment is particularly advantageous since it affords minimum consumption of the carrier current adapter when it is functioning in standby mode.

According to another embodiment, the carrier current adapter comprises a plug-in socket and an input terminal provided for an external voltage converter (AC/DC_D) to be connected. The means for interrupting the DC voltage supply to the main unit is then situated downstream of the voltage converter.

This embodiment is particularly advantageous since it affords minimum consumption of the carrier current adapter when it is functioning in standby mode. In addition, this mode makes it possible to use the voltage converter of an apparatus instead of supplying a converter with the carrier current adapter. The financial cost of the adapter is then greatly reduced.

The features of the invention mentioned above, as well as others, will emerge more clearly from a reading of the following description of an example embodiment, the said description being given in relation to the accompanying drawings, among which.

The references of the elements in the figures that are identical designate the same elements.

According to the present invention, a power-line-communication adapter A is in the form of a box that comprises a mains socket AC_IN.

Figure 1:
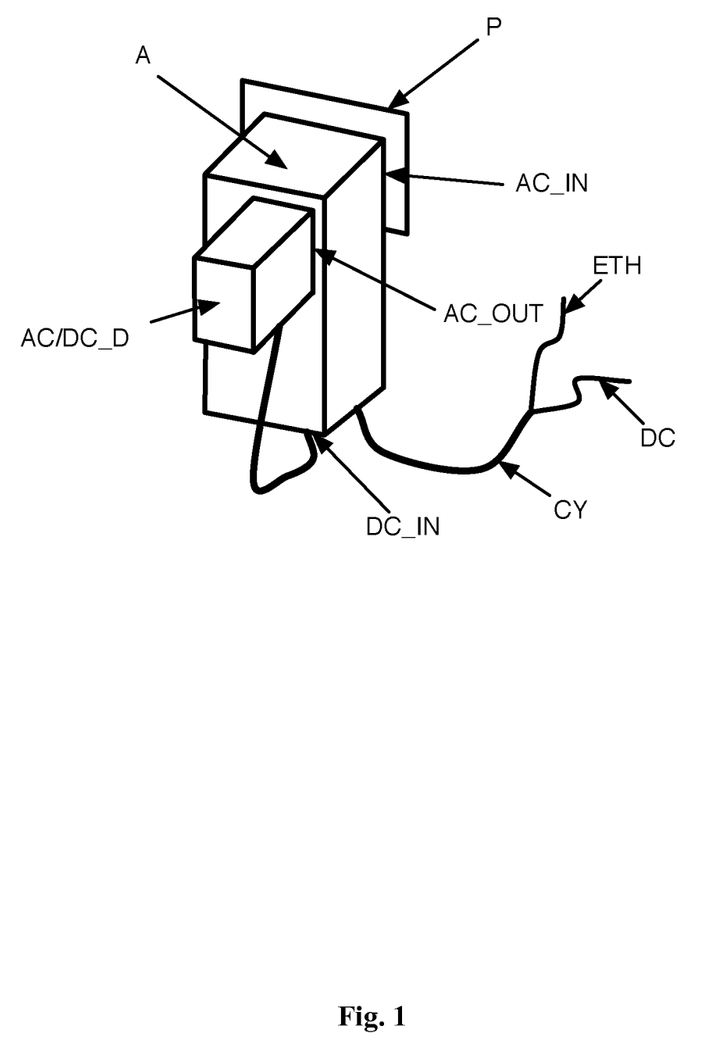
FIG. 1 shows schematically an overall view of an embodiment of a power-line-communication adapter according to the present invention when it is connected to a socket of an electrical network.

The adapter A is shown in FIG. 1 when it is connected to an electrical socket P of an electrical system SE at its mains socket AC_IN.

The adapter A is connected to the electrical network SE firstly to fulfil its function of modem to the carrier current network and secondly to derive the DC voltages necessary for its functioning and for the supply to an apparatus D (not shown).

The adapter A also comprises an output cable CY. This cable comprises a cable ETH for example of the Ethernet type or designed to transport high-rate digital streams and an electrical cable DC designed to supply the apparatus D with DC voltage. Thus the Ethernet cable is connected to the apparatus D for transmitting digital streams between the adapter A and this apparatus D and the cable DC is connected to the apparatus D to supply it with energy.

According to one feature of the invention, the adapter A comprises a plug-in socket AC_OUT and an input terminal DC_IN. According to the example shown, the plug-in socket AC_OUT is situated on a face of the adapter A opposite to the face that carries the mains socket AC_IN and the input terminal DC_IN is situated under the adapter A. Other designs can be envisaged.

According to the example shown in FIG. 1, an external voltage converter AC/DC_D is connected between the plug-in socket AC_OUT and the input terminal DC_IN. In this case, a DC voltage V_IN issuing from the converter AC/DC_D is present on this input terminal. This voltage converter AC/DC_D is for example the one sold with an appliance D that is then connected to the output cable CY. However, the plug-in socket AC_OUT can serve for connecting a multi-socket or any other electrical equipment.

Figure 2:
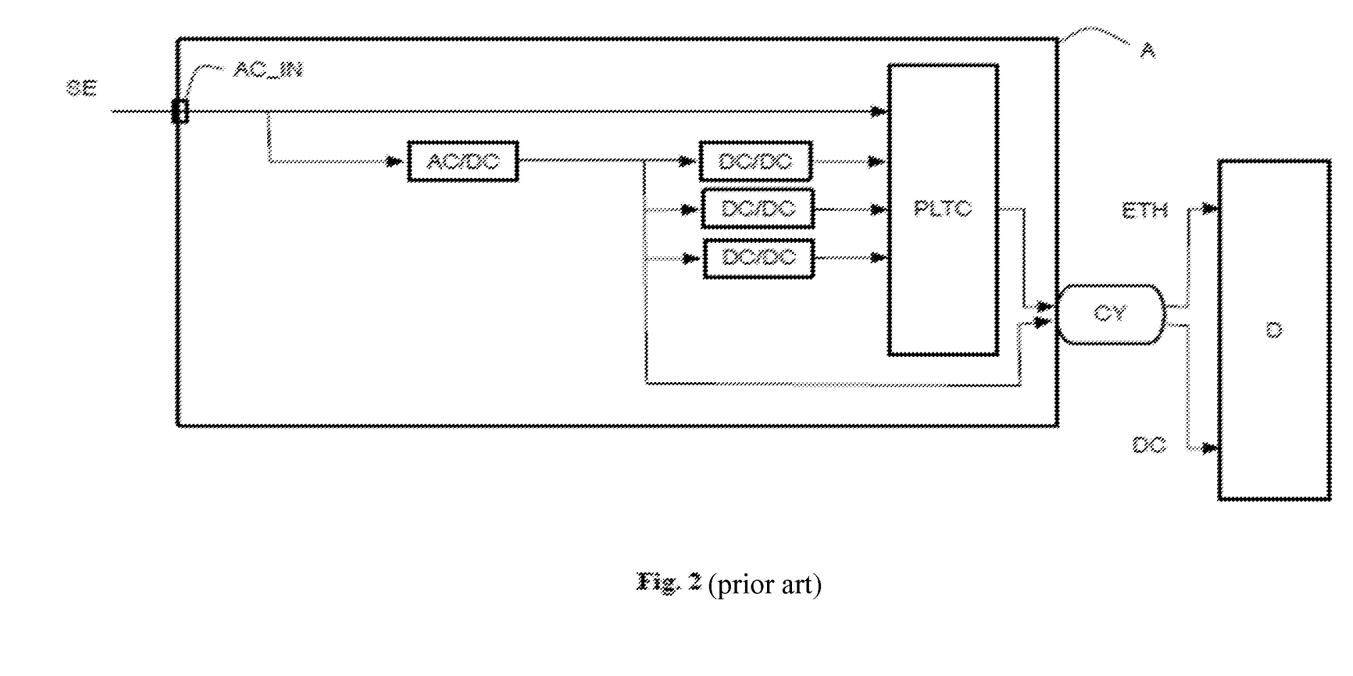
FIG. 2 shows schematically the internal structure of a power-line-communication adapter according to the prior art.

FIG. 2 shows schematically the internal structure of a power-line-communication adapter A according to the prior art.

The adapter A consists of a set of electronic components that can be grouped together in a main functional unit PLTC that is connected to the mains socket AC_IN in order to be supplied with mains voltage.

The adapter A also comprises an internal voltage converter AC/DC the function of which is to convert the mains voltage into a DC voltage.

The adapter A also comprises one or more DC voltage adapters DC/DC the roles of which are to supply derived DC voltages that are required for the functioning of the main unit PLTC. According to the example shown in FIG. 2, the main unit PLTC requires three DC voltages derived from the DC voltage issuing from the voltage converter AC/DC. Three DC voltage adapters DC/DC are therefore required according to this example. It can be noted that the apparatus D is supplied by the DC voltage issuing form the voltage converter AC/DC.

According to one feature the present invention, the adapter A comprises at least one means for interrupting the DC voltage supply of the main unit PLTC when the adapter is functioning in standby mode.

Figure 3:
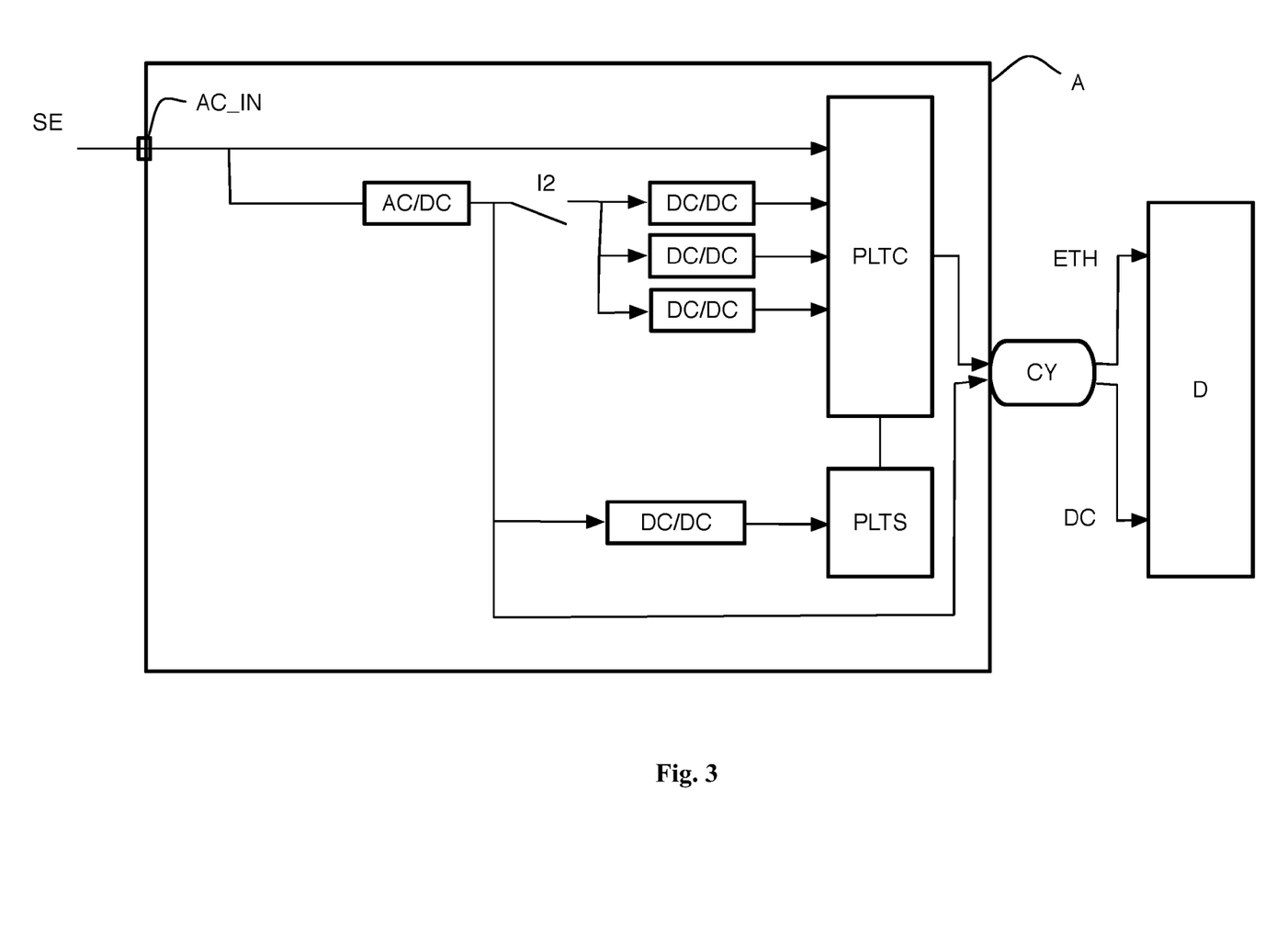
FIG. 3 shows schematically a first embodiment of the internal structure of a power-line-communication adapter according to the present invention.

FIG. 3 shows schematically a first embodiment of the internal structure of a power-line-communication adapter according to the present invention.

According to this embodiment, the means for interrupting the DC voltage supply to the main unit PLTC is situated downstream of the voltage converter AD/DC at the output thereof. This means, referenced I2, is preferably a switch the open and closed state of which is determined by a functional control unit PLTS.

The function of the control unit PLTS is to put the main unit PLTC on standby or to awaken it. In an elaborate approach, this function may be performed according to the monitoring of the network activity by the adapter. Thus, when no activity is detected, the control unit PLTS indicates to the main unit PLTC to deactivate its interfaces, which reduces the consumption of the carrier current adapter A, which then goes into standby mode. As soon as activity is detected, the standby control unit PLTS indicates to the main unit PLTC to reactivate its interfaces and the adapter A then switches into an active mode. In a more commonplace approach, the unit PLTC could be put on standby or awakened by the unit PLTS according to binary information delivered for example by the action of a button (pressed or released) that it would manage.

The control unit PLTS requires being supplied by a DC voltage derived from the voltage issuing from the voltage converter AD/DC. According to the example presented, the control unit PLTS is supplied by a derived DC voltage, that is to say issuing from a voltage adapter DC/DC.

The switch I2 is closed when the adapter A is functioning in active mode and is open when it is functioning in standby mode, thus interrupting the supply to the connections between the output of the internal voltage converter AC/DC and the main unit PLTC. The consumption of the adapter A then functioning in standby mode is thus optimised.

Figure 4:
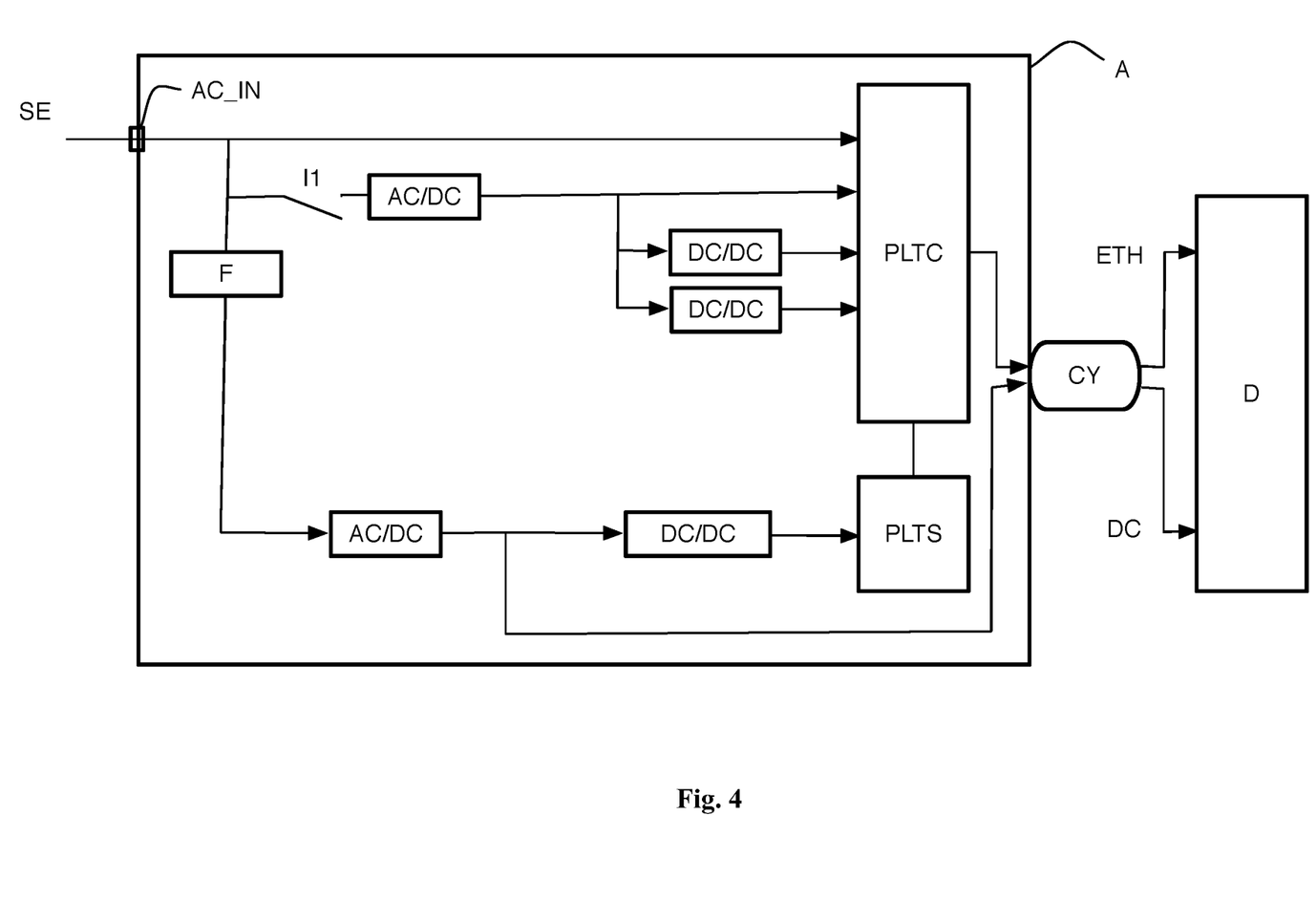
FIG. 4 shows schematically a second embodiment of the internal structure of a power-line-communication adapter according to the present invention.

FIG. 4 shows schematically a second embodiment of the internal structure of a power-line-communication adapter according to the present invention.

It can be noted that, according to this embodiment, the main unit PLTC requires, in addition to the derived DC voltages, a voltage issuing directly from the voltage converter AC/DC. This in no way limits this embodiment since the main unit PLTC can for example require only derived DC voltages. The same applies to the embodiments presented in FIGS. 5 and 6.

According to this embodiment, the adapter A comprises two converters AC/DC, a filter F and a means I1 for interrupting the DC voltage supply to the main unit.

The means I1 is situated upstream of a voltage converter AC/DC at the input thereof. This voltage converter AC/DC is designed to deliver a DC voltage from which the DC voltages that supply the main unit PLTC are derived.

The filter F connects the mains socket AC_IN and the input of the other converter AC/DC. The function of the unit F is to filter the high-frequency signals, thus affording better performance for the transmissions PLT. This other voltage converter AC/DC is designed to deliver a DC voltage that supplies the control unit PLTS via a voltage adapter DC/DC.

The DC voltage supply of the main unit and that of the control unit are therefore independent of each other.

The means I1 is preferably a switch the open and closed state of which is determined by the control unit PLTC. The switch I1 is closed when the adapter A is functioning in active mode and is open when it is functioning in standby mode, thus interrupting the mains voltage supply of a converter AC/DC, the consequence of which is to interrupt the DC voltage supply of the main unit PLTC. The consumption of the adapter A in standby mode is thus greatly reduced since the consumption of the adapter A amounts to that of a single voltage converter AC/DC (instead of two) and of the control unit PLTS.

Figure 5:
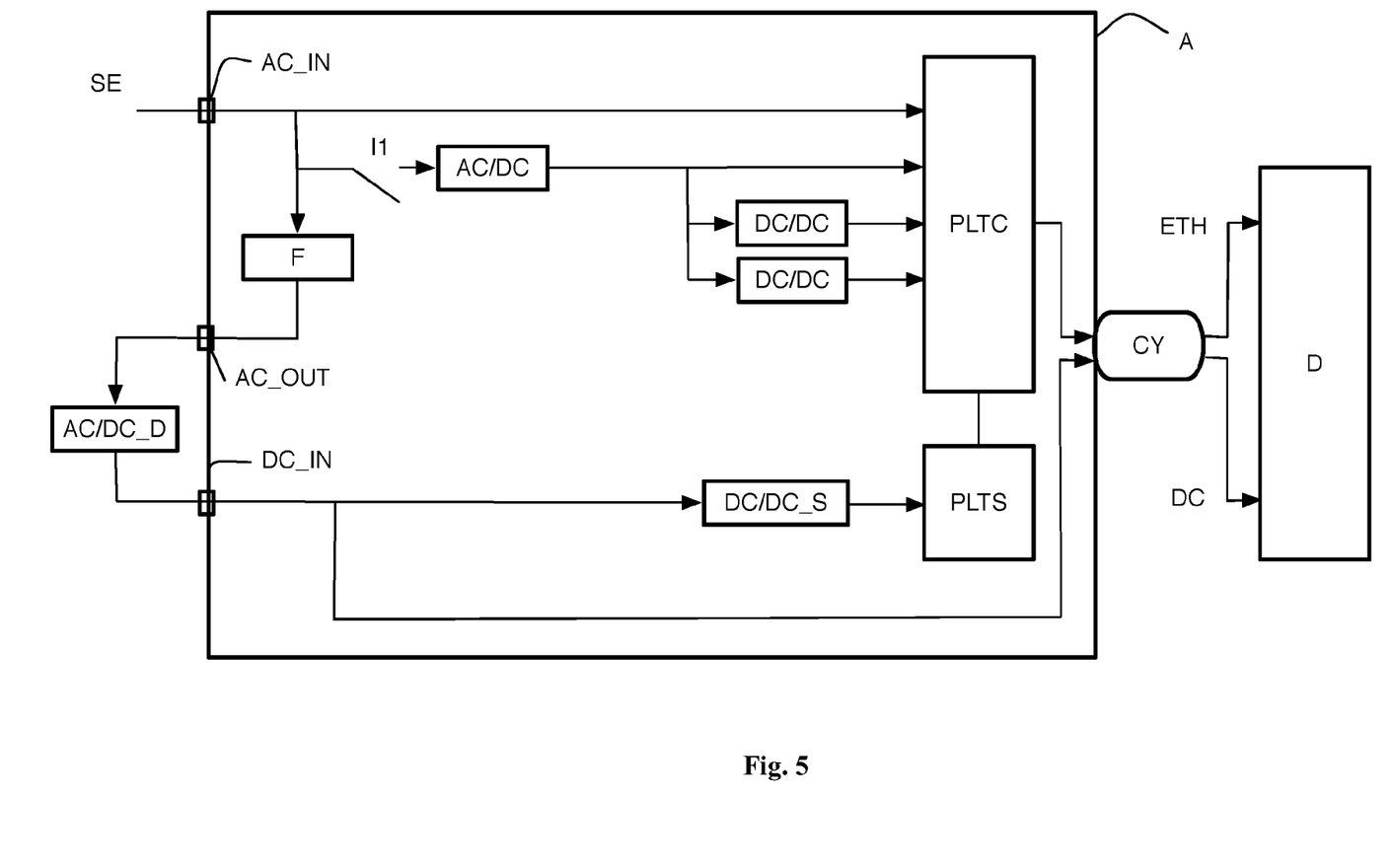
FIG. 5 shows schematically a third embodiment of the internal structure of a power-line-communication adapter according to the present invention.

FIG. 5 shows schematically a third embodiment of the internal structure of a power-line-communication adapter according to the present invention.

This embodiment relates to an adapter A that comprises an plug-in socket AC_OUT and an input terminal DC_IN and is designed so that an external voltage converter AC/DC_D is connected between this plug-in socket AC_OUT and this input terminal DC_IN.

According to this embodiment, the means for interrupting the DC voltage supply of the main unit is situated upstream of the voltage converter AC/DC at its input.

The adapter A also comprises a filter F connecting the mains socket AC_IN and the plug-in socket AC_OUT. The function of the unit F is to filter the high-frequency signals, thus affording better performance for the transmissions PLT.

The mains voltage, then redistributed through the filter F on the plug-in socket AC_OUT, is then converted into a DC voltage V_IN, which is then present on the input terminal DC_IN.

The DC voltage supply of the main unit PLTC is made through the internal voltage converter AC/DC and the DC supply voltage of the control unit PLTS is made through the external converter AC/DC_D.

The DC voltage supply of the main unit and that of the control unit are independent of each other.

The means I1 is closed when the adapter A is functioning in active mode and is open when it is functioning in standby mode, thus interrupting the mains voltage supply of the converter AC/DC, the consequence of which is to interrupt the DC voltage supply of the main unit PLTC. This thus gives an optimum reduction in consumption of the adapter A in standby mode since the consumption of the adapter A amounts solely to that of the control unit PLTS. Since the converter AC/DC, normally used by present power-line-communication adapters is no longer used according to the present invention, only the external converter AC/DC_D functions and continues to supply the apparatus D and the control unit PLTS. Since this converter is designed to have a correct efficiency even when it is not functioning on full load, the energy balance of the use of an adapter A according to this second embodiment is appreciably better than those obtained by the carrier current adapters of FIGS. 2, 3 and 4.

Figure 6:
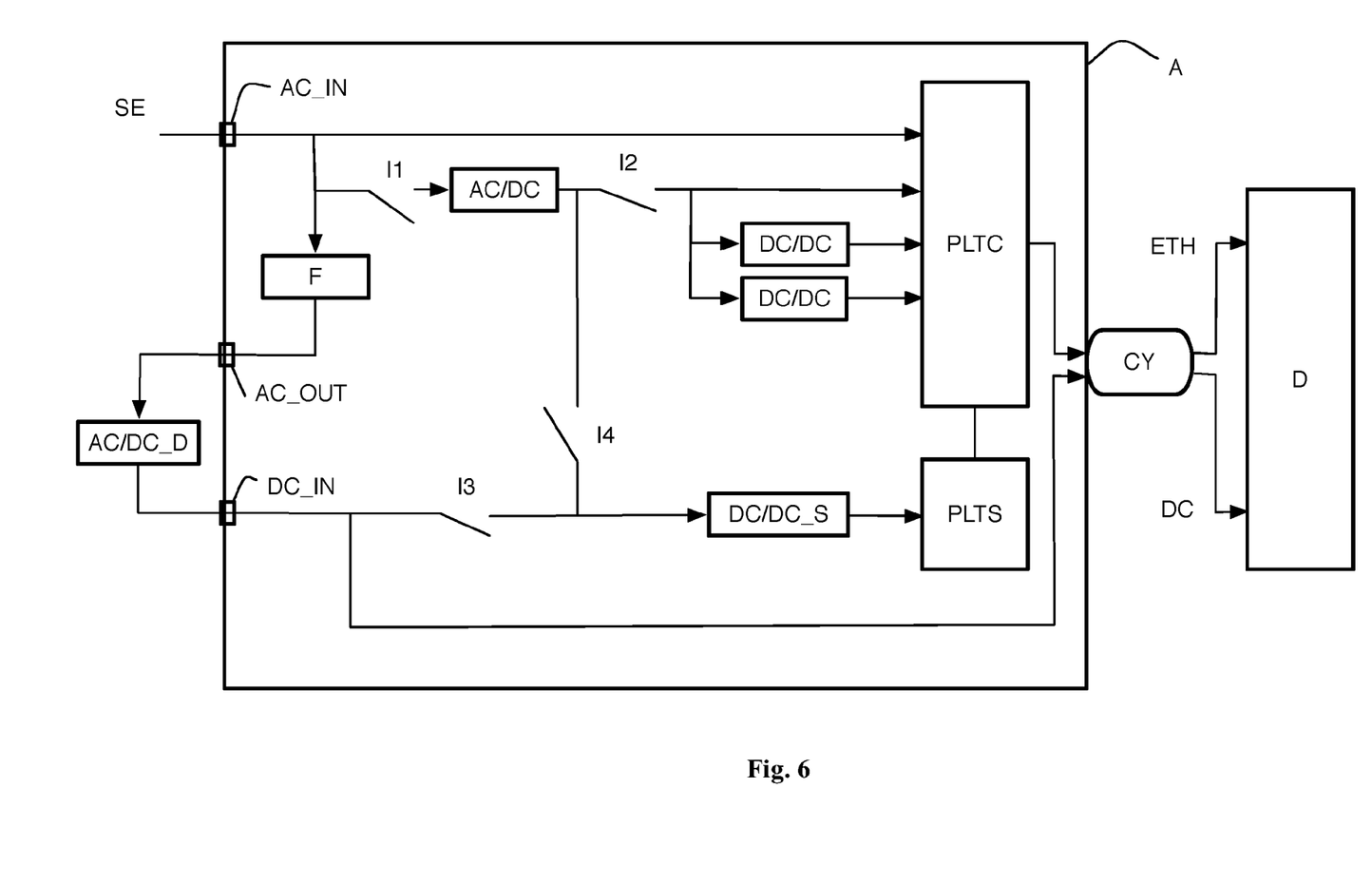
FIG. 6 shows schematically a fourth embodiment of the internal structure of a power-line-communication adapter according to the present invention.

FIG. 6 shows schematically a third embodiment of the internal structure of a power-line-communication adapter according to the present invention.

This embodiment is particularly advantageous since it affords greater flexibility of use of the carrier current adapter. This is because, according to this embodiment, the adapter A can be used either without an external voltage converter AC/DC_D or with. The change from one use to another is detected automatically by the adapter A.

For this purpose, the adapter A comprises a means for detecting whether a DC voltage V_IN is present on the input terminal DC_IN.

It also comprises the means I1 and I2 described above as well as two switches I3 and I4, the open and closed states of which are determined so that the control unit PLTS is supplied either by the internal voltage converter AC/DC when no external voltage converter AC/DC_D is connected between the plug-in socket AC_OUT and the input terminal DC_IN, or by this external voltage converter when it is connected. The switch I3 connects the input terminal DC_IN to the input of the converter DC/DC_S and the switch I4 connects the output of the converter AC/DC to the input of the converter DC/DC_S.

If a voltage V_IN is detected on the terminal DC_IN, that is to say for example if a converter AC/DC_D is connected between the plug-in socket AC_OUT and the input terminal DC_IN, the switches I1, I2 and I3 are closed and the switch I4 is open when the adapter A is functioning in active mode.

When the control unit detects network inactivity or a pressing on a standby button and decides that the adapter A must be functioning in standby mode, the control unit opens the switch I1, thus causing an optimum reduction in consumption of the adapter A as explained in relation to FIG. 5.

If no voltage V_IN is present on the terminal DC_IN, the switches I1, I2 and I4 are closed and the switch I3 is open when the adapter A is functioning in active mode. The DC voltage supply of the main unit PLTC then takes place through the internal converter AC/DC and the DC voltage supply of the control unit PLTS is done through the converter DC/DC_S then supplied by the DC voltage delivered by the internal converter AC/DC.

When the controller detects network inactivity or a pressing on a standby button and decides that the adapter must be functioning in standby mode, the control unit opens the switch I2, thus interrupting the supply of the connections between the output of the internal voltage converter AC/DC and the main unit PLTC. This thus gives a reduction in consumption of the adapter in standby mode. However, such a use of the adapter remains less favourable in energy terms compared with a use that uses an external converter AC/DC_D since the internal converter AC/DC functions at low efficiency when the adapter is in standby mode. Nevertheless, this method of use remains advantageous since it provides for the power-line-communication adapter autonomous functioning and a reduction in its consumption compared with present power-line-communication adapters.

Thus the two means I1 and I2 afford optimisation of the consumption in standby mode of the adapter A by interrupting the DC voltage supply of the main unit as soon as the adapter switches into standby mode.

According to a variant of the third or fourth embodiment, the DC voltage adapter that is used for supplying the control unit PLTS, which is referenced DC/DC_S in FIGS. 5 and 6, is designed to supply a DC voltage for supplying the control unit PLTS when the DC voltage V_IN falls in a predetermined voltage range PV. This voltage adapter thus enables the carrier current adapter to respond to the problem of heterogeneity of the appliances in terms of voltage. This is because, as can be seen in FIGS. 5 and 6, the input terminal DC_IN is directly connected to the cable DC of the output cable. This direct connection makes it possible to supply the apparatus D with DC voltage. As the appliances liable to be associated with the adapter A may require voltages of different values (then supplied by the voltage converter AC/DC_D), the voltage V_IN present on the input terminal DC_IN may vary. By defining a voltage adapter DC/DC_S that makes it possible to supply a constant DC voltage when the voltage V_IN falls within a predetermined range PV so as to cover all present appliances, the adapter A can be associated with any one of these appliances.

In its hardware aspect, according to the voltages involved in the adapter A, the means used for implementing the switches I3 and I4 and the commands thereof may be very simple, for example diodes, or more complex such as for example transistors of the MOSFET type. Whatever the case, implementation of the present invention is inexpensive.

The control unit PLTS also comprises a microcontroller that contains software designed to control the switches as indicated previously.

The means I1 may be an opto-triac providing both the interruption and the isolation of the secondary with respect to the area TRT (e.g. conformity with the safety standard EN60950). As for the means I2, a simple MOSFET transistor may be used.

The state of the adapter A is a variable of the software loaded in the microcontroller. This variable may change according to the network activity passing over the unit PLTC issuing from the level 1 listening (e.g. NLP/FLP/OFDM detector) and level 2 (binary signals issuing from an MII bus or Ethernet and PLT processors). In a more commonplace fashion, the state of the adapter could also be an explicit external command such as pressing a button.

The invention claimed is:

1. A powerline communication adapter comprising:
   a housing;
   a main functional unit (PLTC) supplied with DC voltage by a first AC/DC voltage converter and connected to a main socket (AC_IN) for connecting the adapter to an electrical network;
   a first switch (I1) for interrupting the DC voltage supply to the main unit (PLTC) when the adapter is functioning in a standby mode, said first switch being positioned between the first AC/DC voltage converter and the main socket (AC_IN);
   a control unit (PLTS) supplied with DC voltage;
   wherein the adapter also comprises a second AC/DC voltage converter for supplying DC voltage to the control unit (PLTS) that is independent of the first AC/DC voltage converter that supplies the main functional unit, the second AC/DC voltage converter being connected to the main socket (AC_IN) upstream from the first switch, and wherein the main functional unit (PLTC), the first AC/DC voltage converter, the first switch and the control unit (PLTS) are fixed inside the housing.

2. The powerline communication adapter according to claim 1, in which the second voltage converter is fixed inside the housing.

3. The powerline communication adapter according to claim 1, comprising an input terminal (DC_IN) and a plug-in socket (AC_OUT), the plug-in socket (AC_OUT) and the input terminal (DC_IN) being constructed to connect in a removable manner the second AC/DC voltage converter (AC/DC_D).

4. The powerline communication adapter according to claim 3, wherein the adapter is adapted for detecting whether a DC voltage (V_IN) is present on the input terminal (DC_IN), and comprises a second switch (I3, I4) allowing to supply the control unit (PLTS) either by the first AC/DC voltage converter when no DC voltage (V_IN) is present on the input terminal (DC_IN), or by the second AC/DC voltage converter when a DC voltage (V_IN) is present on the input terminal (DC_IN).

5. The powerline communication adapter according to claim 4, in which the first switch (I1) and a third switch (I2) for interrupting the DC voltage supply to the main unit (PLTC) and the second switch allowing to supply the control unit (PLTS) either by the first AC/DC voltage converter or by the second AC/DC voltage converter (AC/DC_D) are controlled by the control unit (PLTS).

6. The powerline communication adapter according to claim 1, which comprises a DC voltage adapter (DC/DC_S) constructed to supply a constant DC voltage for supplying the control unit (PLTS) when a DC voltage falling within a predetermined voltage range (PV) is present on the input of the DC voltage adapter (DC/DC_S).

7. A system for distributing digital streams on an electrical network, wherein the system comprises at least one powerline communication adapter in accordance with claim 1.

* * * * *